United States Patent
Yamamura et al.

(10) Patent No.: US 11,088,384 B2
(45) Date of Patent: Aug. 10, 2021

(54) FUEL CELL MODULE

(71) Applicant: HONDA MOTOR CO., LTD., Tokyo (JP)

(72) Inventors: Hideichi Yamamura, Wako (JP); Shigeru Toda, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 163 days.

(21) Appl. No.: 16/445,851

(22) Filed: Jun. 19, 2019

(65) Prior Publication Data
US 2019/0393539 A1    Dec. 26, 2019

(30) Foreign Application Priority Data

Jun. 21, 2018 (JP) .............................. JP2018-117522

(51) Int. Cl.
| | |
|---|---|
| *H01M 8/2475* | (2016.01) |
| *H01M 8/0213* | (2016.01) |
| *H01M 8/0226* | (2016.01) |
| *H01M 8/04007* | (2016.01) |
| *H01M 8/04223* | (2016.01) |
| *H01M 8/04225* | (2016.01) |
| *H01M 8/04014* | (2016.01) |

(52) U.S. Cl.
CPC ....... *H01M 8/2475* (2013.01); *H01M 8/0213* (2013.01); *H01M 8/0226* (2013.01); *H01M 8/04007* (2013.01); *H01M 8/04022* (2013.01); *H01M 8/04067* (2013.01); *H01M 8/04225* (2016.02); *H01M 8/04268* (2013.01)

(58) Field of Classification Search
CPC .......... H01M 8/04007; H01M 8/0422; H01M 8/0467; H01M 8/04225; H01M 8/04268; H01M 8/06; H01M 8/0662; H01M 8/0213; H01M 8/0226; H01M 8/04067; H01M 8/2475

See application file for complete search history.

(56) References Cited

U.S. PATENT DOCUMENTS

| | | | | |
|---|---|---|---|---|
| 6,124,053 | A | * | 9/2000 | Bernard .............. H01M 8/2484 429/415 |
| 2004/0229096 | A1 | | 11/2004 | Standke et al. |
| 2018/0375127 | A1 | * | 12/2018 | Yamazaki ......... H01M 8/04753 |

FOREIGN PATENT DOCUMENTS

| | | |
|---|---|---|
| CA | 3009462 | 6/2017 |
| JP | 2017-027766 | 2/2017 |

OTHER PUBLICATIONS

European Search Report dated Dec. 19, 2019, 6 pages.

\* cited by examiner

*Primary Examiner* — Gregg Cantelmo
(74) *Attorney, Agent, or Firm* — Rankin, Hill & Clark LLP

(57) ABSTRACT

A fuel cell module is equipped with a fuel cell stack having a stack body in which a plurality of flat plate-shaped fuel cells adapted to generate electrical power by an electrochemical reaction between a fuel gas and an oxygen-containing gas are stacked, and a start-up combustor adapted to generate a combustion gas for raising a temperature of the fuel cells. In the fuel cell module, the start-up combustor is arranged in the vicinity of oxygen-containing gas introduction ports through which the oxygen-containing gas in the interior of the fuel cell stack is introduced into the fuel cells.

9 Claims, 5 Drawing Sheets

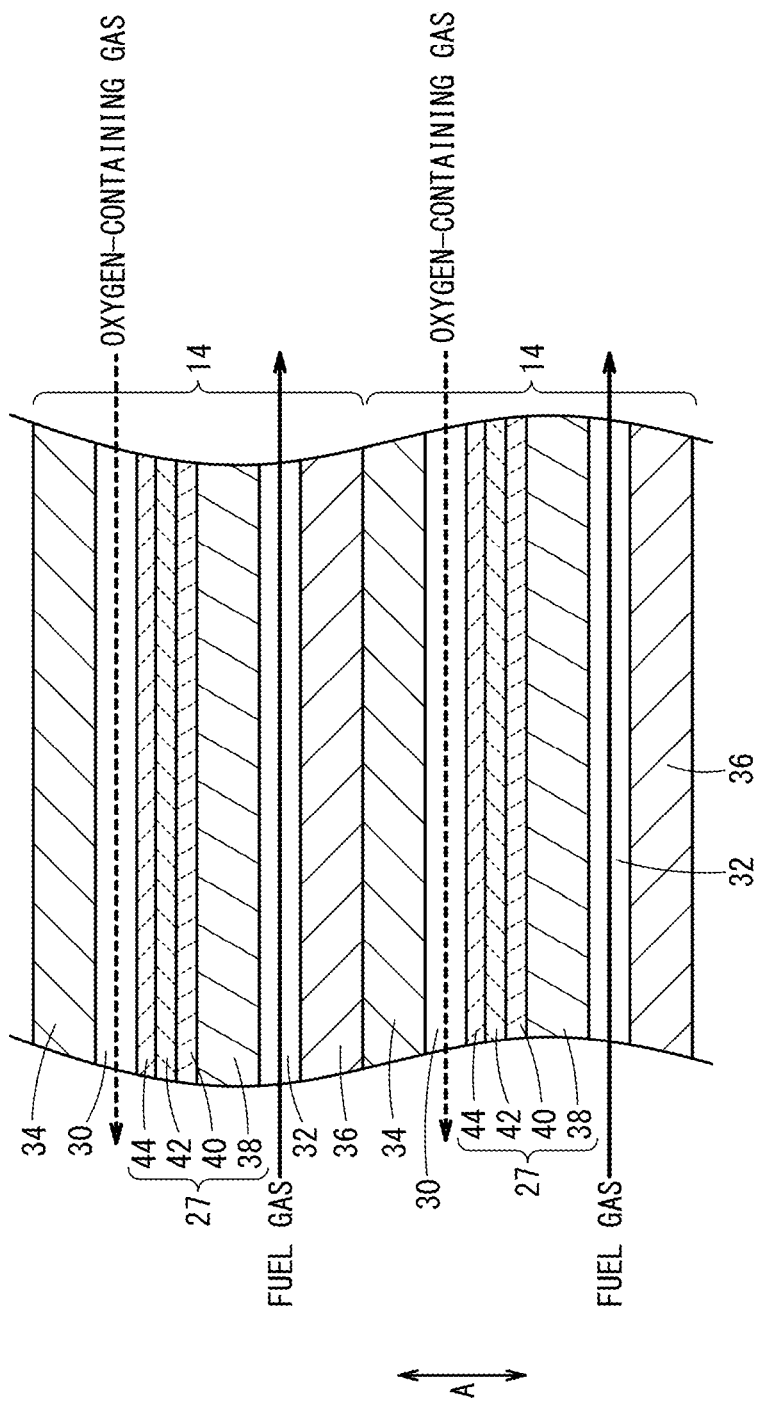

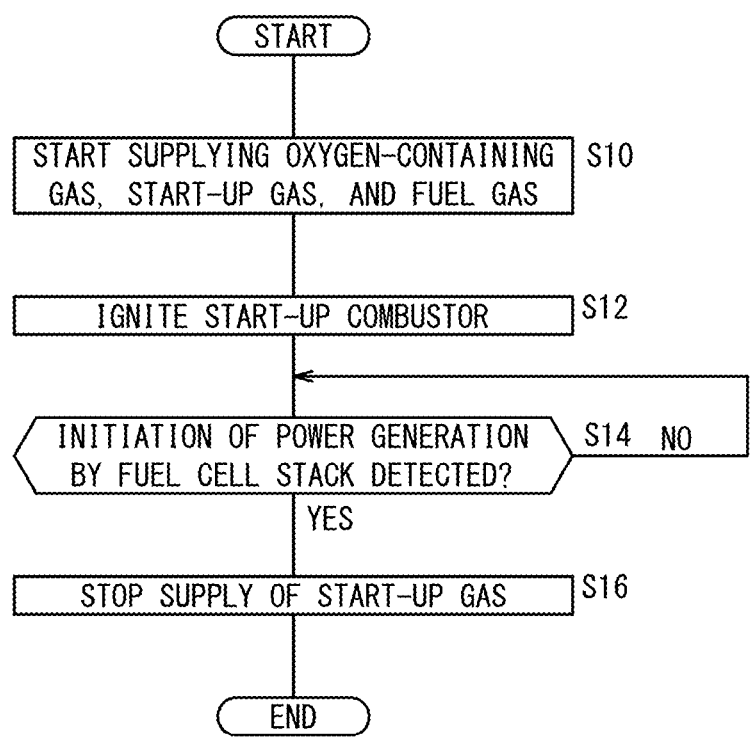

FUEL CELL MODULE

CROSS-REFERENCE TO RELATED APPLICATION

This application is based upon and claims the benefit of priority from Japanese Patent Application No. 2018-117522 filed on Jun. 21, 2018, the contents of which are incorporated herein by reference.

BACKGROUND OF THE INVENTION

Field of the Invention

The present invention relates to a fuel cell module in which a plurality of fuel cells are stacked which generate electricity by an electrochemical reaction that takes place between a fuel gas and an oxygen-containing gas.

Description of the Related Art

A solid oxide fuel cell (SOFC) employs, for example, an oxide ion conductor such as stabilized zirconia as a solid electrolyte. An anode and a cathode are joined to both sides of the solid electrolyte. Such an electrolyte electrode assembly (hereinafter also referred to as an MEA) is sandwiched between separators (interconnectors). During use thereof, generally, a predetermined number of electrolyte electrode assemblies and separators are stacked together to form a fuel cell stack.

SOFCs are operated at a comparatively high operating temperature, and therefore, when the fuel cells are initiated, it is necessary for the stacked plurality of fuel cells to be raised in temperature to such an operating temperature.

In Japanese Laid-Open Patent Publication No. 2017-027766, a fuel cell power generating system is disclosed in which a combustor is provided externally of a container for the fuel cell stack, and the fuel is subjected to flame combustion at a time of start-up to thereby heat the fuel cell stack.

SUMMARY OF THE INVENTION

In such a conventional fuel cell module, a start-up combustor is provided below the fuel cell stack, and a high temperature combustion gas which is generated by the start-up combustor is guided in a uniform manner to the fuel cell stack by a flow passage having a predetermined shape. However, in the above-described fuel cell module, the apparatus configuration is made larger in scale, and since the portion to be heated upon initiation of the fuel cell module is enlarged, the heat capacity necessary for initiation thereof becomes greater. As a result, the time until initiation takes place becomes longer.

An object of the present invention is to provide a fuel cell module which is compact, and excellent in terms of its ability to initiate operation of the fuel cell module.

An aspect of the present invention is characterized by a fuel cell module comprising a fuel cell stack having a stack body in which a plurality of flat plate-shaped fuel cells adapted to generate electrical power by an electrochemical reaction between a fuel gas and an oxygen-containing gas are stacked, and a start-up combustor adapted to generate a combustion gas for raising a temperature of the fuel cells, wherein the fuel cell stack includes an oxygen-containing gas introduction passage through which the oxygen-containing gas flows, and oxygen-containing gas introduction ports formed on side portions of the fuel cells, and adapted to introduce into the interior of the fuel cells the oxygen-containing gas of the oxygen-containing gas introduction passage, and the start-up combustor is arranged in the interior of the fuel cell stack, in a manner so as to face toward a side portion of the stack body, on an oxygen-containing gas pathway between the oxygen-containing gas introduction passage and the oxygen-containing gas introduction ports.

In accordance with the fuel cell module having the aforementioned aspect, since the start-up combustor is disposed in the interior of the fuel cell stack, the fuel cell module can be made compact. Further, the start-up combustor is disposed in the vicinity of the fuel cells. Consequently, the fuel cells can be efficiently heated by way of radiation and heat conduction from the start-up combustor. Further, since the high temperature combustion gas that is generated by the start-up combustor is introduced into the fuel cells without heating extraneous portions, the fuel cells can be heated efficiently. Consequently, the temperature of the fuel cells can be raised rapidly, and the ability to initiate operation thereof is excellent.

The above and other objects, features, and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIG. 4 is a cross-sectional view of fuel cells shown in FIG. 1; and

FIG. 5 is a flowchart showing operations at a time that the fuel cell module of FIG. 1 is initiated.

DESCRIPTION OF THE PREFERRED EMBODIMENTS

A preferred embodiment of the present invention will be described in detail below with reference to the accompanying drawings. In the present specification, in order to facilitate description, the stacking direction of the fuel cells may also be referred to as a vertical direction, and the direction orthogonal to the stacking direction may also be referred to as a layering direction. However, such notations should not be considered as imposing any limitation on the direction in which the fuel cell module is installed.

First Embodiment

Figure 1:
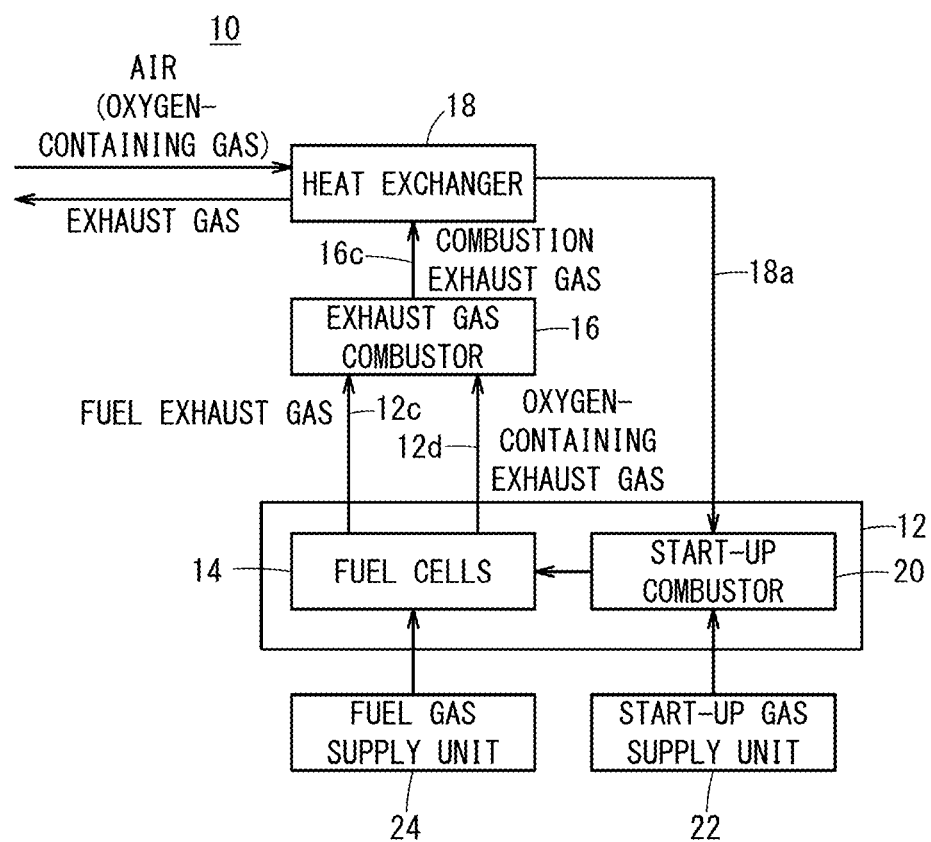
FIG. 1 is a block diagram of a fuel cell module according to an embodiment of the present invention.

A fuel cell module 10 according to the present embodiment shown in FIG. 1 can be used not only as a portable generator, but also for various applications such as stationary and vehicle-mounted uses.

Figure 2:
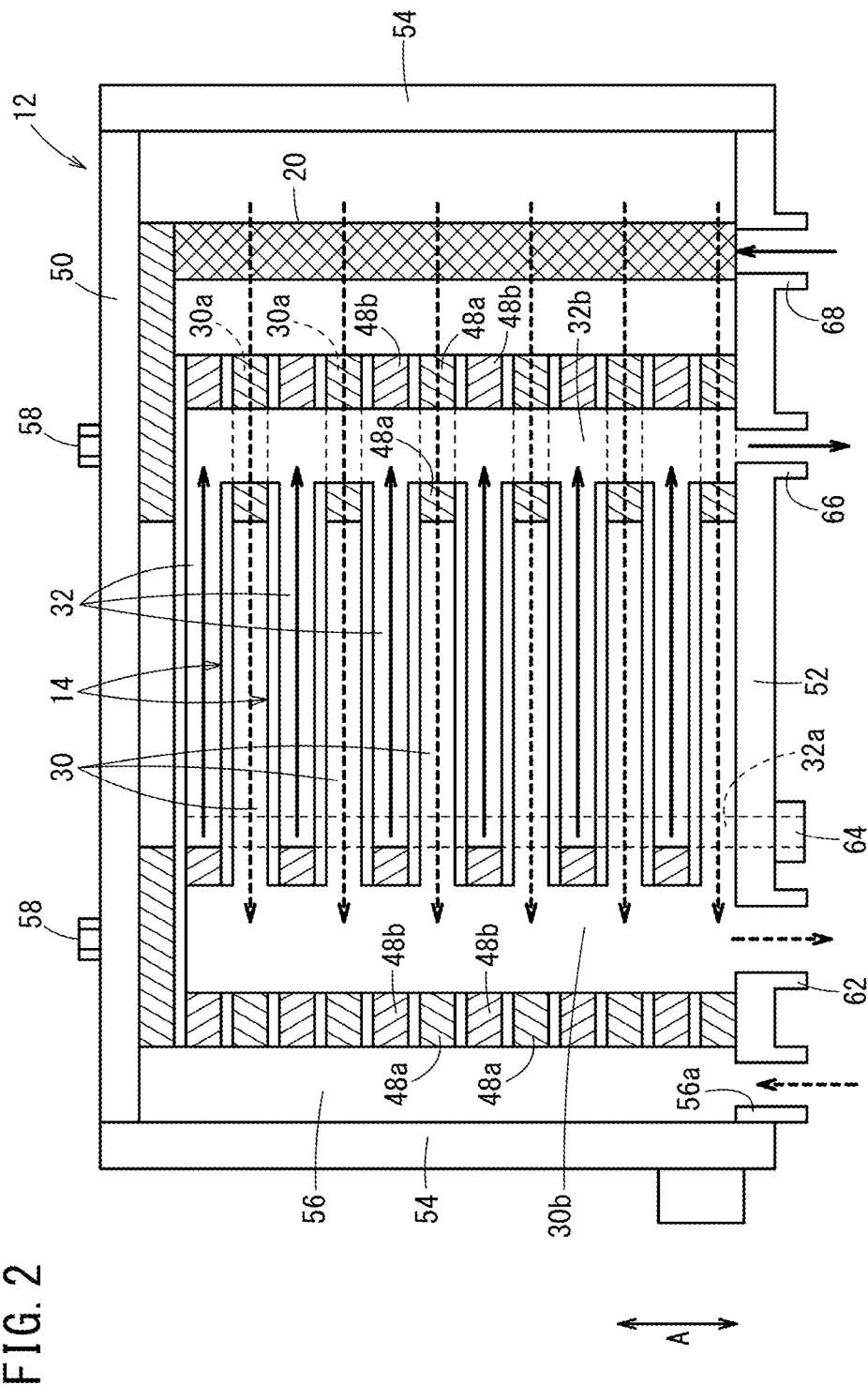
FIG. 2 is a cross-sectional view schematically showing the structure in a stacking direction of the fuel cell stack shown in FIG. 1.

The fuel cell module 10 is equipped with a flat plate laminated type fuel cell stack 12, an exhaust gas combustor 16, a heat exchanger 18, and a start-up combustor 20. The fuel cell stack 12 is equipped with flat plate-shaped fuel cells 14 (solid oxide fuel cells) that generate electrical power by electrochemical reactions taking place between a fuel gas (a gas obtained by mixing primarily hydrogen and carbon monoxide), and an oxygen-containing gas (air). As shown in FIG. 2, a plurality of the fuel cells 14 are stacked in a thickness direction (the direction of the arrow A), together with end plates 50 and 52 being disposed on both ends in the stacking direction of the fuel cells 14 (hereinafter simply referred to as a stacking direction).

As shown in FIG. 4, each of the fuel cells 14 comprises an electrolyte electrode assembly (MEA) 27 on which there are provided, for example, in this order on a support plate 38 made of metal, an anode 40, an electrolyte layer 42 constituted by an oxide ion conductor made of stabilized zirconia or the like, and a cathode 44.

The support plate 38 is constituted, for example, by a porous metal plate, or a metal plate in which a large number of through holes are formed, and the fuel gas is capable of flowing through the anode 40. As the metal that constitutes the support plate 38, a material can be used that possesses heat resistance with respect to the operating temperature of the fuel cells 14, together with having a coefficient of thermal expansion equivalent to that of the electrolyte layer 42. More specifically, ferritic stainless steel or the like can be used for the support plate 38.

A cathode side separator 34 and an anode side separator 36 are disposed on both sides of the electrolyte electrode assembly 27. An oxygen-containing gas flow field 30 for supplying the oxygen-containing gas to the cathode 44 is formed on the cathode side separator 34. A fuel gas flow field 32 for supplying the fuel gas to the anode 40 is formed on the anode side separator 36.

The operating temperature of the fuel cells 14 is a high temperature on the order of several hundred degrees centigrade ° C., and the fuel gas, which is obtained by reforming the raw fuel and contains hydrogen and carbon monoxide, is supplied to the anode 40. Air that is raised in temperature by the heat exchanger 18 is supplied to the cathode 44 as an oxygen-containing gas.

Figure 3:
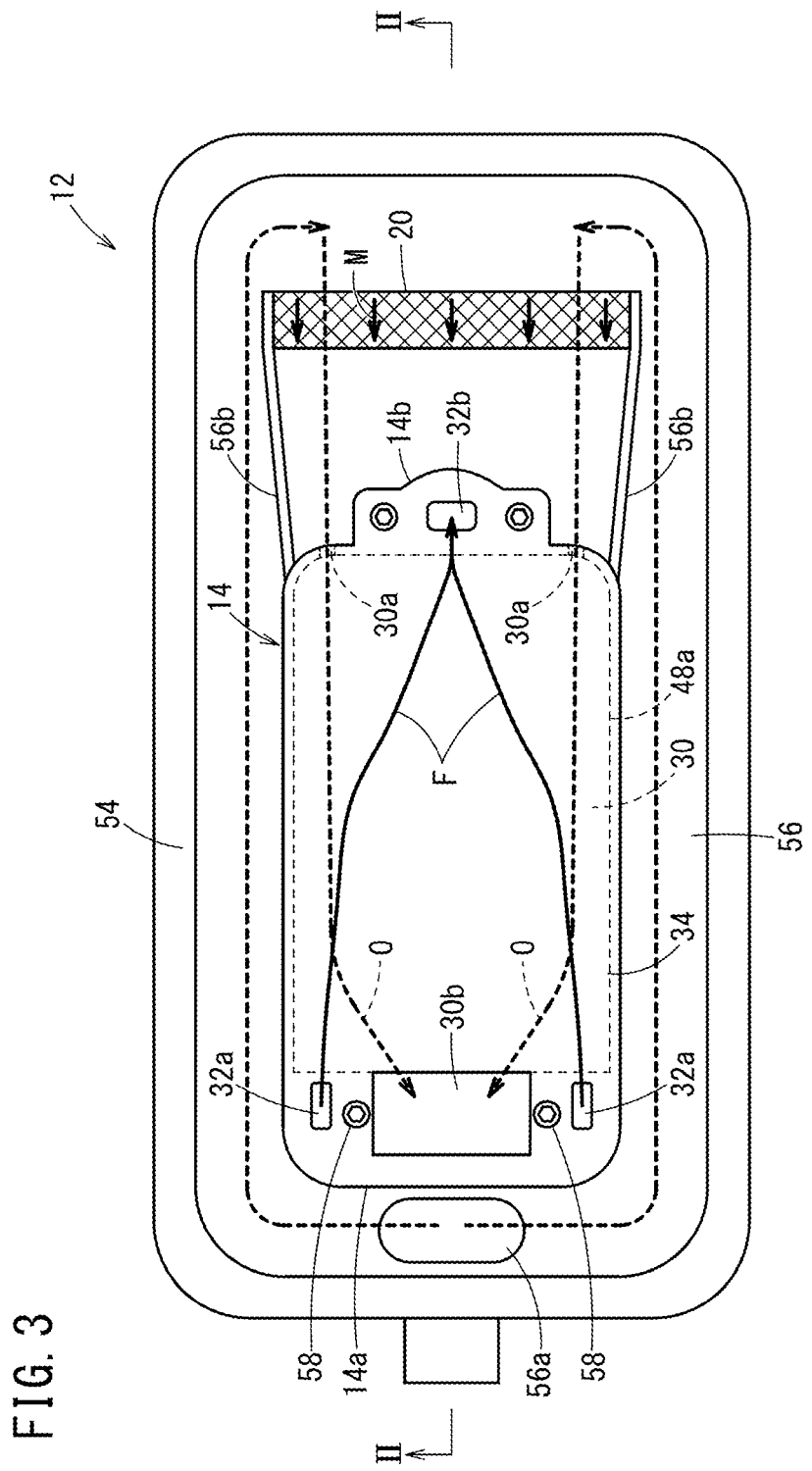
FIG. 3 is a cross-sectional view in a layering direction of the fuel cell stack shown in FIG. 1, it being noted that the line II-II in FIG. 3 corresponds to a cross-section of FIG. 2.

As shown in FIG. 3, the fuel cells 14 are formed in a substantially rectangular shape, and at one end portion 14a thereof, an oxygen-containing gas outlet passage 30b, and fuel gas inlet passages 32a are formed. Among the inlet passages, two of the fuel gas inlet passages 32a are provided with the oxygen-containing gas outlet passage 30b being sandwiched between them. Further, a fuel gas outlet passage 32b is formed at another end portion 14b of the fuel cells 14.

As shown in FIG. 2, the fuel gas inlet passages 32a and the fuel gas outlet passage 32b are formed to penetrate through the plurality of fuel cells 14, and extend in the stacking direction of the fuel cells 14 (in the direction of the arrow A in FIG. 2). The fuel gas inlet passages 32a and the fuel gas outlet passage 32b communicate with the fuel gas flow fields 32 of the plurality of fuel cells 14, and are separated from the oxygen-containing gas flow fields 30 by first seal members 48a. Further, as shown in FIG. 2, the oxygen-containing gas outlet passage 30b extends in the stacking direction (the direction of the arrow A) of the fuel cells 14, and communicates with the plurality of oxygen-containing gas flow fields 30. The oxygen-containing gas outlet passage 30b and the fuel gas flow fields 32 are separated by the second seal members 48b.

As shown in FIG. 2, peripheral edge portions of the oxygen-containing gas flow fields 30 of the fuel cells 14 are sealed by the first seal members 48a, and peripheral portions of the fuel gas flow fields 32 are sealed by the second seal members 48b. The first seal members 48a may be formed on the cathode side separators 34, and the second seal members 48b may be formed on the anode side separators 36.

Further, as shown in FIG. 3, at the other end portion 14b of the fuel cells 14, oxygen-containing gas introduction ports 30a are formed, which are formed to penetrate in the layering direction in the first seal members 48a that seal the peripheral edge portions of the respective oxygen-containing gas flow fields 30. The oxygen-containing gas flow fields 30 are in communication with a later-described oxygen-containing gas introduction passage 56 via the oxygen-containing gas introduction ports 30a. The oxygen-containing gas that is introduced from the oxygen-containing gas introduction ports 30a into the oxygen-containing gas flow fields 30, as shown by the dashed-line arrows O, flows through the oxygen-containing gas flow fields 30 and is discharged from the oxygen-containing gas outlet passage 30b.

The stacked fuel cells 14 are disposed between an end plate 50 on an upper end side and an end plate 52 on a lower end side, and are fixed together by set screws 58. By the set screws 58 and the end plates 50 and 52, a predetermined clamping load is applied in the stacking direction of the plurality of fuel cells 14. The end plates 50 and 52 are formed so as to be larger in size in a planar direction than the fuel cells 14. A side wall 54 is provided between an outer peripheral portion of the end plate 50 and an outer peripheral portion of the end plate 52. The side wall 54 is formed over the entire perimeter of the outer peripheral portion of the end plates 50 and 52, and seals the periphery of the fuel cells 14. The space that is formed between the fuel cells 14 and the side wall 54 constitutes the oxygen-containing gas introduction passage 56.

As shown in FIG. 3, in the oxygen-containing gas introduction passage 56, there are provided an oxygen-containing gas inlet 56a, oxygen-containing gas guide members 56b, and the start-up combustor 20. The oxygen-containing gas inlet 56a is disposed in the vicinity of the one end portion 14a where the oxygen-containing gas outlet passage 30b, which becomes the highest in temperature within the fuel cells 14, is formed. The oxygen-containing gas introduction passage 56 extends from the oxygen-containing gas inlet 56a to a side on the other end portion 14b of the fuel cells 14, while passing around the outer side of the fuel cells 14. The oxygen-containing gas, while flowing through the oxygen-containing gas introduction passage 56, is raised in temperature by heat exchange with the fuel cells 14.

The start-up combustor 20 is arranged in the vicinity of the oxygen-containing gas introduction ports 30a that are formed on the side on the other end portion 14b of the fuel cells 14. The start-up combustor 20 is provided with a large number of openings through which the oxygen-containing gas is capable of flowing in the direction of the arrows M shown in the drawing. In the interior of the start-up combustor 20, a combustion unit is provided which carries out a combustion reaction by blowing a combustible gas therein. As shown in FIG. 2, the combustion unit of the start-up combustor 20 extends in the stacking direction of the plurality of stacked fuel cells 14, and is configured in a manner so as to be capable of uniformly supplying the high-temperature combustion gas to each of the respective fuel cells 14. It should be noted that the start-up combustor 20 need not necessarily be arranged in the vicinity of the oxygen-containing gas introduction ports 30a, and may be arranged inside the fuel cell stack 12 in a pathway between the oxygen-containing gas introduction passage 56 and the oxygen-containing gas introduction ports 30a of the fuel cells 14.

The start-up combustor 20 can be configured as a catalytic combustor that performs catalytic combustion, or alternatively, as a flame combustor that performs flame combustion. In the case that the start-up combustor 20 is configured in the form of a catalytic combustor, a catalyst containing Pt (platinum), Ni (nickel), Rh (rhodium), Pd (palladium) or the like is filled in the interior of the start-up combustor 20. If the start-up combustor 20 is configured in the form of a flame combustor, a plurality of nozzles are provided that blow the combustible gas into the oxygen-containing gas.

A bottom part of the start-up combustor 20 is in communication with a start-up gas introduction port 68, and via the start-up gas introduction port 68, a combustible gas (start-up gas) is supplied thereto from a start-up gas supply unit 22 (see FIG. 1). As the start-up gas, a raw fuel gas containing a hydrocarbon such as methane, ethane, propane, butane or the like can be used directly without modification.

The start-up combustor 20 is preferably installed in the vicinity of the oxygen-containing gas introduction ports 30a, to such an extent that the combustion gas generated by the combustion reaction between the oxygen-containing gas and the start-up gas can reach the oxygen-containing gas introduction ports 30a without being inclined upwardly.

As shown in FIG. 3, the oxygen-containing gas guide members 56b are disposed between side portions of the start-up combustor 20 and side portions of the fuel cells 14. The oxygen-containing gas guide members 56b separate the space between the start-up combustor 20 and the fuel cells 14 from the oxygen-containing gas introduction passage 56. The oxygen-containing gas guide members 56b serve to prevent mixing of the oxygen-containing gas that does not pass through the start-up combustor 20 together with the oxygen-containing gas (combustion gas) that has passed through the start-up combustor 20 from among the oxygen-containing gas that flows through the oxygen-containing gas introduction passage 56.

As shown in FIG. 2, the oxygen-containing gas inlet 56a which is in communication with the oxygen-containing gas introduction passage 56, an oxygen-containing gas discharge port 62 which is in communication with the oxygen-containing gas outlet passage 30b, a fuel gas introduction port 64 which is in communication with the fuel gas inlet passages 32a, a fuel gas discharge port 66 which is in communication with the fuel gas outlet passage 32b, and the start-up gas introduction port 68 which is in communication with the start-up combustor 20 are formed in the end plate 52 on a lower end side thereof.

The fuel gas discharge port 66 communicates with the exhaust gas combustor 16 (see FIG. 1) via a fuel exhaust gas flow passage 12c. The oxygen-containing gas discharge port 62 communicates with the exhaust gas combustor 16 via an oxygen-containing exhaust gas flow passage 12d. Further, the heat exchanger 18 (see FIG. 1) is in communication with the oxygen-containing gas inlet 56a via an oxygen-containing gas flow passage 18a.

As shown in FIG. 1, the exhaust gas combustor 16 causes combustion to occur between the fuel exhaust gas, which is the fuel gas that is discharged from the fuel cell stack 12, and the oxygen-containing exhaust gas, which is the oxygen-containing gas, and thereby generates a high temperature combustion gas. The combustion gas generated by the exhaust gas combustor 16 is supplied to the heat exchanger 18 via a combustion exhaust gas flow passage 16c.

The heat exchanger 18 raises the temperature of the oxygen-containing gas (air) by way of heat exchange with the combustion gas. The heat exchanger 18 and the oxygen-containing gas inlet 56a (see FIG. 2) of the fuel cell stack 12 are connected via the oxygen-containing gas flow passage 18a. The oxygen-containing gas that is raised in temperature by the heat exchanger 18 is supplied to the oxygen-containing gas inlet 56a of the fuel cell stack 12 through the oxygen-containing gas flow passage 18a.

A gas containing a hydrocarbon such as methane, ethane, propane, butane or the like can be supplied as a raw fuel to the fuel cell stack 12. A fuel gas supply unit 24 comprises, for example, a steam reformer, a partial oxidation reformer, or the like, and reforms the raw fuel containing hydrocarbons, and converts the raw fuel into a fuel gas that primarily contains hydrogen and carbon monoxide, and then supplies the fuel gas to the fuel cell stack 12.

In the case that the fuel gas supply unit 24 is a partial oxidation reformer, a fuel gas of a high temperature (for example, 500° C. to 1000° C.) which is generated by an exothermic reaction can be supplied to the fuel cells 14, and therefore, at the time of start-up, heating of the fuel cells 14 can be suitably carried out from the side of the fuel gas flow fields 32.

The start-up gas supply unit 22 supplies to the start-up combustor 20 the hydrocarbon containing start-up gas that is supplied as the raw fuel to the fuel cells 14.

Actions and effects of the fuel cell module 10 which is configured in the foregoing manner will be described below together with operations thereof.

As shown in step S10 of FIG. 5, at the time of start-up, the fuel cell module 10 begins supplying the oxygen-containing gas, the start-up gas, and the fuel gas to the fuel cell stack 12. In this instance, for example, as shown in FIG. 1, air is fed as the oxygen-containing gas into the heat exchanger 18 by a non-illustrated blower pump or the like. The air after having flowed through the heat exchanger 18 is introduced into the oxygen-containing gas introduction passage 56 of the fuel cell stack 12 through the oxygen-containing gas flow passage 18a. Further, the fuel gas is supplied from the fuel gas supply unit 24 to the fuel cells 14 via the fuel gas inlet passages 32a of the fuel cell stack 12. The start-up gas is supplied from the start-up gas supply unit 22 to the start-up combustor 20 of the fuel cell stack 12.

Next, as shown in step S12 of FIG. 5, the start-up combustor 20 is ignited, thereby causing the start-up gas and the oxygen-containing gas (air) to undergo combustion and generate the high temperature combustion gas. The supplied amount of the start-up gas may be less than an amount required for the combustion of oxygen within the oxygen-containing gas, and oxygen may be left remaining within the combustion gas. The combustion gas generated by the start-up combustor 20 is introduced from the oxygen-containing gas introduction ports 30a into the oxygen-containing gas flow fields 30 (see FIG. 2), and as shown by the dashed-line arrows O in FIG. 3, the fuel cells 14 are heated and the temperature thereof is raised. Further, the fuel cells 14 are heated by radiant heat that is generated due to the combustion taking place in the start-up combustor 20. The combustion gas that has passed through the oxygen-containing gas flow fields 30 flows into the exhaust gas combustor 16 via the oxygen-containing gas outlet passage 30b and the oxygen-containing exhaust gas flow passage 12d.

On the other hand, the fuel gas supplied from the fuel gas supply unit 24 flows into the fuel gas flow fields 32 from the fuel gas inlet passages 32a. In addition, as shown by the solid line arrows F in FIG. 3, the fuel gas flows toward the fuel gas outlet passage 32b. In the case that the fuel gas supply unit 24 supplies a fuel gas which is reformed by a partial oxidation reforming reaction, the fuel gas which is of a comparatively high temperature is supplied to the fuel gas flow fields 32, and therefore, heating can also be suitably carried out from the side of the fuel gas flow fields 32. Moreover, since the electrolyte layer 42 is not activated until power generation by the fuel cells 14 is initiated, the fuel gas that flows through the fuel gas flow fields 32 is discharged from the fuel gas outlet passage 32b without causing any electrochemical reaction to occur. The fuel gas that is discharged from the fuel gas outlet passage 32b is delivered to the exhaust gas combustor 16 via the fuel exhaust gas flow passage 12c.

In the exhaust gas combustor 16, the fuel gas and the oxygen remaining within the combustion gas of the start-up combustor 20 are combusted, and thereby generate a high temperature combustion exhaust gas. The combustion exhaust gas undergoes heat exchange with the oxygen-containing gas that is introduced into the heat exchanger 18, and after having raised the temperature of the oxygen-containing gas, the combustion exhaust gas is exhausted. Thereafter, the oxygen-containing gas that was heated by the heat exchanger 18 is supplied to the fuel cell stack 12.

Thereafter, in step S14 of FIG. 5, it is detected whether or not power generation by the fuel cells 14 has been initiated. The detection of initiation of power generation by the fuel cells 14 can be carried out, for example, by measuring the temperature of the fuel cells 14 using a temperature sensor provided inside the fuel cell stack 12, and detecting whether a temperature has been reached at which the solid electrolyte, which is made from an oxide, is activated. In step S14, in the case that initiation of power generation by the fuel cells 14 is not detected (step S14: NO), supply of the start-up gas to the start-up combustor 20 is continued, and the fuel cells 14 continue to be heated.

On the other hand, in the case that initiation of power generation by the fuel cells 14 is detected (step S14: YES), then in step S16, the start-up gas supply unit 22 stops the supply of the start-up gas to the start-up combustor 20. Consequently, the operation of the fuel cell module 10 at the time of start-up is completed.

Thereafter, the fuel cell module 10 transitions to steady operation, and operates independently to generate electrical power, utilizing the heat generated accompanying the electrochemical reaction of the fuel cells 14 and the combustion heat of the exhaust gas combustor 16.

More specifically, the fuel gas supplied from the fuel gas supply unit 24 flows through the fuel gas flow fields 32 of the fuel cell stack 12. The fuel gas (fuel exhaust gas) that has flowed through the fuel gas flow fields 32 passes through the fuel gas outlet passage 32b, and is discharged from the fuel gas discharge port 66. The fuel exhaust gas is introduced into the exhaust gas combustor 16 that communicates with the fuel exhaust gas flow passage 12c.

As shown in FIG. 1, the oxygen-containing gas passes through the heat exchanger 18 and the oxygen-containing gas flow passage 18a, and is introduced into the fuel cell stack 12 from the oxygen-containing gas introduction ports 30a (see FIG. 2). In the heat exchanger 18, the supplied air (oxygen-containing gas) is raised in temperature by the combustion gas. The oxygen-containing gas emitted from the heat exchanger 18 is introduced into the fuel cell stack 12 from the oxygen-containing gas inlet 56a. The oxygen-containing gas flows through the oxygen-containing gas introduction passage 56 around the periphery of the fuel cells 14, thereby undergoing heat exchange with the fuel cells 14 and being further heated. Thereafter, the oxygen-containing gas enters into the start-up combustor 20. The start-up combustor 20 does not carry out combustion after starting of the fuel cells 14, but allows the oxygen-containing gas that has flowed therein to pass directly without modification.

As shown in FIG. 2, the oxygen-containing gas is introduced into the fuel cells 14 from the oxygen-containing gas introduction ports 30a, and flows through the oxygen-containing gas flow fields 30. The fuel gas passes through the fuel gas inlet passages 32a, and flows through the fuel gas flow fields 32. Upon performing the above actions, the air flows through the oxygen-containing gas flow fields 30, whereas the fuel gas flows through the fuel gas flow fields 32. Consequently, a chemical reaction is generated at the cathode 44 and the anode 40 of each of the fuel cells 14, and generation of electrical power is performed.

The oxygen-containing gas (oxygen-containing exhaust gas) that has flowed through the oxygen-containing gas flow fields 30 passes through the oxygen-containing gas outlet passage 30b, and is discharged from the oxygen-containing gas discharge port 62. The oxygen-containing exhaust gas passes through the oxygen-containing exhaust gas flow passage 12d, and is introduced into the exhaust gas combustor 16. The fuel gas (fuel exhaust gas) that has flowed through the fuel gas flow fields 32 passes through the fuel gas outlet passage 32b, and is discharged from the fuel gas discharge port 66. The fuel exhaust gas passes through the fuel exhaust gas flow passage 12c, and is introduced into the exhaust gas combustor 16.

The fuel gas and the oxygen-containing gas that are introduced into the exhaust gas combustor 16 are subjected to combustion inside the exhaust gas combustor 16, and the combustion exhaust gas is supplied to the heat exchanger 18. At this time, by way of radiation or heat conduction, a portion of the combustion heat generated by the exhaust gas combustor 16 is used for maintaining the operating temperature of the fuel cell stack 12. Thereafter, after having been used to raise the temperature of the oxygen-containing gas in the heat exchanger 18, the combustion exhaust gas is exhausted from the fuel cell module 10.

The fuel cell module 10 described above realizes the following advantageous effects.

In the fuel cell module 10, the start-up combustor 20 is located in the interior of the fuel cell stack 12, and is disposed in the oxygen-containing gas introduction passage 56 in the vicinity of the oxygen-containing gas introduction ports 30a. Consequently, there is no need for the start-up combustor 20 to be disposed externally of the fuel cell stack 12, and the fuel cell module 10 can be made small in scale. Further, since the start-up combustor 20 is disposed in the vicinity of the fuel cells 14, the fuel cells 14 can be efficiently heated by way of radiation and heat conduction. Furthermore, since the high temperature combustion gas that is generated by the start-up combustor 20 is introduced into the fuel cells 14 without heating extraneous portions, the fuel cells 14 can be heated efficiently. More specifically, the fuel cells 14 can be efficiently heated without heating extraneous locations at the time of start-up, and the heat capacity required for initiation of operation can be minimized. Therefore, the operation of the fuel cells 14 can be rapidly initiated.

In the fuel cell module 10, the start-up combustor 20 may include a combustion unit that extends in the stacking direction of the fuel cell stack 12. In accordance with this feature, a uniformly heated combustion gas can be supplied to each of the fuel cells 14 that are arranged in plurality in the stacking direction.

In the fuel cell module 10, there are also provided the oxygen-containing gas guide members 56b that prevent mixing between the combustion gas emitted from the start-up combustor 20, and the oxygen-containing gas flowing through the oxygen-containing gas introduction passage 56. In accordance with this feature, it is possible to prevent the temperature of the combustion gas from falling due to mixing of the low temperature oxygen-containing gas into the high temperature combustion gas that is emitted from the start-up combustor 20, and thus, the fuel cells 14 can be heated in an efficient manner.

In the fuel cell module 10, the start-up combustor 20 may be a catalytic combustor. By configuring the start-up combustor 20 in the form of a catalytic combustor, the combustion reaction can be performed even with a small amount of combustible gas. Therefore, the oxygen concentration within the combustion gas emitted from the start-up combustor 20 can be increased. In this case, since a greater amount of the fuel gas can be introduced into the exhaust gas combustor 16, the amount of heat generated by the exhaust gas combustor 16 is increased as necessary, and the amount of heat necessary for starting up or activating auxiliary devices apart from the fuel cell stack 12 can also be increased.

In the fuel cell module 10, the start-up combustor 20 may be a diffusion combustor. In accordance with this feature, the apparatus configuration of the start-up combustor 20 can be simplified.

In the fuel cell module 10, the start-up gas may be supplied to the start-up combustor 20 only during a time that the fuel cells 14 are initiated. In accordance with this feature, after power generation by the fuel cells 14 has been initiated, there is no need to supply the raw fuel to the start-up combustor 20, and since a greater amount of the raw fuel can be used for generating electrical power in the fuel cells 14, the fuel utilization efficiency is improved.

The fuel cell module 10 may be further equipped with the exhaust gas combustor 16 that induces combustion between the fuel exhaust gas and the oxygen-containing exhaust gas discharged from the fuel cell stack 12, and the heat exchanger 18 that applies the heat of the combustion exhaust gas generated by the exhaust gas combustor 16 to the oxygen-containing gas, and the start-up combustor 20 may be disposed between the heat exchanger 18 and the fuel cells 14.

In the foregoing manner, by disposing the start-up combustor 20 between the heat exchanger 18 and the fuel cells 14, the oxygen-containing gas which is preheated by the heat exchanger 18 can be further raised in temperature by the start-up combustor 20, and therefore, the amount of fuel supplied to the start-up combustor 20 can be reduced. Further, by heating the air (oxygen-containing gas) which has a greater flow rate than the fuel gas, the start-up combustor 20 is capable of causing the fuel cells 14 to be initiated more quickly.

In the fuel cell module 10, each of the fuel cells 14 may be equipped with the support plate 38 made of metal, the anode 40 formed on the support plate 38, the electrolyte layer 42 formed on the anode 40, and the cathode 44 formed on the electrolyte layer 42.

In the foregoing manner, by providing such a structure in which the electrolyte layers 42 are supported by the support plates 38 made of metal, the electrolyte layers 42 are unlikely to suffer from damage with respect to rapid heating, and by introducing the high temperature combustion gas into the fuel cells 14, it is possible to rapidly initiate operation thereof.

In the fuel cell module 10, the oxygen-containing gas introduction ports 30a which introduce the oxygen-containing gas to the fuel cells 14 may be formed on the side portion of the stack body. In accordance with this feature, the combustion gas of the start-up combustor 20, which is arranged in the interior of the fuel cell stack 12, can be efficiently introduced into the fuel cells 14. In this case, the start-up combustor 20 may be disposed in the vicinity of the oxygen-containing gas introduction ports 30a of the side portion of the stack body.

Although the present invention has been described by way of a preferred embodiment, the present invention is not limited to the embodiment described above, and it goes without saying that various modifications may be made thereto within a range that does not deviate from the essence and gist of the present invention.

What is claimed is:

1. A fuel cell module comprising:
a fuel cell stack having a stack body in which a plurality of flat plate-shaped fuel cells adapted to generate electrical power by an electrochemical reaction between a fuel gas and an oxygen-containing gas are stacked; and
a start-up combustor adapted to generate a combustion gas for raising a temperature of the fuel cells;
wherein the fuel cell module includes:
end plates each disposed on an upper end side and an lower end side of the fuel cell stack and formed so as to be larger in size in a planar direction than the fuel cell stack;
a side wall formed over an entire perimeter between an outer peripheral portion of the end plate on the upper end side and an outer peripheral portion of the end plate on the lower end side to seal the fuel cell stack;
an oxygen-containing gas introduction passage which is formed in a space between the side wall and the fuel cell stack and through which the oxygen-containing gas flows, and
an oxygen-containing gas introduction port formed on a side portion of the fuel cell stack, and communicating with the oxygen-containing gas introduction passage and an oxygen-containing gas flow field which supplies the oxygen-containing gas to a cathode to introduce into the oxygen-containing gas flow field of the fuel cell stack the oxygen-containing gas of the oxygen-containing gas introduction passage; and
the start-up combustor is arranged in an interior of the fuel cell module and on an oxygen-containing gas pathway between the oxygen-containing gas introduction passage and the oxygen-containing gas introduction port, in a manner so as to face toward the side portion of the fuel cell stack on which the oxygen-containing gas introduction port is formed.

2. The fuel cell module according to claim 1, wherein the start-up combustor includes a combustion unit that extends in a stacking direction of the fuel cell stack.

3. The fuel cell module according to claim 1, further comprising an oxygen-containing gas guide member adapted to prevent mixing between the combustion gas emitted from the start-up combustor and the oxygen-containing gas flowing through the oxygen-containing gas introduction passage.

4. The fuel cell module according to claim 1, wherein the start-up combustor is a catalytic combustor.

5. The fuel cell module according to claim 1, wherein the start-up combustor is a diffusion combustor.

6. The fuel cell module according to claim 1, further comprising:

an exhaust gas combustor configured to induce combustion of a fuel exhaust gas and an oxygen-containing exhaust gas discharged from the fuel cell stack; and a heat exchanger configured to apply heat of a combustion exhaust gas generated by the exhaust gas combustor to the oxygen-containing gas;

wherein the start-up combustor is disposed between the heat exchanger and the fuel cells.

7. The fuel cell module according to claim 1, wherein the oxygen-containing gas introduction port is formed on the side portion of the stack body.

8. The fuel cell module according to claim 7, wherein the start-up combustor is disposed in the vicinity of the oxygen-containing gas introduction port of the side portion of the stack body.

9. The fuel cell module according to claim 6, wherein the oxygen-containing gas introduction passage is disposed along a peripheral edge portion of the fuel cell stack from an oxygen-containing gas inlet which is disposed in the vicinity of one end portion where an oxygen-containing gas outlet passage, which becomes highest in temperature within the fuel cell stack, is formed, toward another end portion where the start-up combustor is provided, the start-up combustor being provided between the oxygen-containing gas introduction passage and the oxygen-containing gas introduction port.

* * * * *